(12) United States Patent
Ho et al.

(10) Patent No.: US 11,821,693 B2
(45) Date of Patent: Nov. 21, 2023

(54) FLUORORESIN BUNDLE OF HEAT EXCHANGE DEVICE AND MANUFACTURING METHOD THEREOF

(71) Applicant: Allied Supreme Corp., Taipei (TW)

(72) Inventors: Chiao-Sheng Ho, Xianxi Township (TW); Chih-Cheng Chang, Xianxi Township (TW); Chi-Hua Wu, Xianxi Township (TW)

(73) Assignee: Allied Supreme Corp., Taipei (TW)

( * ) Notice: Subject to any disclaimer, the term of this patent is extended or adjusted under 35 U.S.C. 154(b) by 5 days.

(21) Appl. No.: 17/577,657

(22) Filed: Jan. 18, 2022

(65) Prior Publication Data
US 2022/0252355 A1   Aug. 11, 2022

(30) Foreign Application Priority Data
Feb. 9, 2021   (TW) .................................. 110105172

(51) Int. Cl.
*B23P 15/26* (2006.01)
*F28D 7/16* (2006.01)
*F28F 21/06* (2006.01)

(52) U.S. Cl.
CPC ................ *F28D 7/16* (2013.01); *B23P 15/26* (2013.01); *F28F 21/062* (2013.01)

(58) Field of Classification Search
CPC ............ F28D 7/16; B23P 15/26; F28F 21/062
See application file for complete search history.

(56) References Cited

U.S. PATENT DOCUMENTS 10,131,087 B2   11/2018   Kimura et al.
10,279,539 B2    5/2019   Kimura et al.

FOREIGN PATENT DOCUMENTS

| CN | 104245279 A | | 12/2014 |
|---|---|---|---|
| JP | 2002162190 A | * | 6/2002 |
| JP | 2002162190 A | | 6/2002 |
| TW | M509721 U | | 10/2015 |

OTHER PUBLICATIONS

Sato Y; JP-2002162190-A Machine Translation (Year: 2002).*

* cited by examiner

*Primary Examiner* — Lee A Holly

(57) ABSTRACT

The present invention reveals a manufacturing method of a fluororesin bundle having a plurality of fluororesin tube hold by a fixing element as a bundle. The bundle is pre-sealed when the ends of the fluororesin tubes are heated to a status being deformable and mount on the fixing element while being place in a vacuum environment and receive a thermal energy. Immersing the pre-sealed bundle into a heating pool to extend the mounted surface between the fluororesin tubes and the fixing element. Thus, a high quality fluororesin bundle can be done by using the above processes.

12 Claims, 3 Drawing Sheets

FLUORORESIN BUNDLE OF HEAT EXCHANGE DEVICE AND MANUFACTURING METHOD THEREOF

FIELD OF INVENTION

An element of heat exchange device, especially a fluororesin bundle of heat exchange device and manufacturing method thereof.

BACKGROUND OF THE INVENTION

Fluororesin material is well known material with high material performance properties like non-sticking, chemical resistance, heat resistance, excellent surface smoothness with low friction coefficient and UV resistance that can be used in chemical industry widely. For example, fluororesin tubes are commonly used in the semiconductor industry to deliver chemical liquids in variant applications.

In few prior technologies, a heating device is adopted to directly melt and mount a plurality of fluororesin tubes with a fix element to form a tube bundle. However, it always comes with an uneven heating situation by the direct heating device while heating up the fluororesin tubes and the fixing element. Therefore, some fluororesin tubes placed inside the tube bundle are not melted and deformed enough while the fluororesin tubes placed near the periphery of the tube bundle are ready for mounting with the fixing element. This uneven heating situation not only extends unnecessary process time, but also causes a problem with false welding on some spots of the fluororesin tubes and the fixing element, and this problem leads to higher risk of dangerous chemical liquids leaking which causes serious safety and pollution issues.

SUMMARY OF THE INVENTION

To overcome the aforementioned shortcomings of the prior heating method and device, the present invention provides a manufacturing method to form a high quality fluororesin bundle of heat exchange device.

The present invention provides a manufacturing method of fluororesin bundle having multiple fluororesin tubes and a fixing element with multiple holes for accepting the fluororesin tubes, the method comprising steps of: 1) placing one end of each the fluororesin tubes respectively into each hole to hold the fluororesin tubes by the fixing element and forming a bundle, wherein end surfaces of the ends of the fluororesin tubes and the fixing element form a flat surface; 2) providing a vacuum environment to the bundle and a thermal energy to the flat surface simultaneously to melt and deform the ends of the fluororesin tubes and mount the deformed end sections of the fluororesin tubes near the end surfaces thereof on inner wall of the holes respectively; and 3) immersing the pre-sealed bundle into a heating pool from the flat surface to extend the mounted surface between the fluororesin tubes and the fixing element.

Wherein, the thermal energy melt and deform a preferred length of deformed ends of the fluororesin tubes 10 is 2 mm+/−1 mm.

Wherein, use a thermal radiation plate to provide a flat contact surface being securely mounted with the flat surface.

Wherein, the heating pool fills a heated liquid and provides a Celsius temperature between 150-500 degrees to heat up the heated liquid.

Wherein, the heated liquid is preferred to have a salt therein, the salt can be potassium nitrate, sodium nitrite, sodium chloride, calcium chloride, lithium carbonate, potassium carbonate, sodium carbonate, barium chloride or mixture thereof.

Wherein, a concentration of the salt in the heated liquid can be 20%-80%.

Wherein, the immersing process is separated into few steps with immersing and maintaining the bundle at a certain depth for a while to wait a partial section of the fluororesin tubes being securely mounted on the inner surface of the holes, and then immerse more to mount next section of the fluororesin tubes with the fixing element until a preferred immersion depth being achieved.

The present invention also provides a fluororesin bundle of heat exchange device which is made from the manufacturing method in claim 1 comprises a plurality of fluororesin tubes and a fixing element with a plurality of holes, wherein each fluororesin tube 10 is a hollow tube made by polyfluoroalkoxy (PFA).

Wherein, the fixing element is made by fluororesin material, the material of the fixing element can be polytetrafluoroethene (PTFE), fluorinated ethylene propylene (FEP), polyfluoroalkoxy (PFA), ethylene-tetra-fluoro-ethylene (ETFE), polyvinylidene difluoride (PVDF) or mixture thereof.

Wherein, the fixing element is made by PTFE.

The fluororesin bundle of heat exchange device revealed by the present invention can achieve the following advantages:

1. Cooperating the vacuum device and the thermal device to pre-seal the fluororesin tubes and the fixing element simultaneously can reduce defective rate less than 1% and overcome false welding phenomenon.

2. Each section of the fluororesin tubes can receive the thermal energy equally from immersed into the heating pool and securely mounted on the inner surface of the holes, which can prevent uneven heating situation.

3. Combining the pre-sealing process to form the bundle and immersing process to securely mount the fluororesin tube with the fixing set can reduce the spending time more than 80% comparing to only use a thermal radiation method with slowly heat transfer rate.

4. Pre-sealing the ends of the each fluororesin tube in the fixing element before immersing into the heating pool can prevent the heated liquid of the heating pool from remaining in the space between the fluororesin tube and the hole, thus can maintain the cleanness of the manufacturing process and avoid the risk of pollution.

5. Pre-sealing the ends of the each fluororesin tube 10 in the fixing element 20 before immersing into the heating pool 40 can prevent the heated liquid of the heating pool 40 from remaining in the space between the fluororesin tube 10 and the hole 21, thus can maintain the cleanness of the manufacturing process and avoid the risk of pollution.

6. The fluororesin bundle remains the flat surface 22 after the manufacturing method mentioned above, which can be used immediately without other secondary processing.

DETAILED DESCRIPTION OF THE PREFERRED EMBODIMENTS

In order to make purposes, technical solutions, and advantages of the present invention to be clearer, the following content provides some preferred embodiments in accordance with the present invention.

Figure 1:
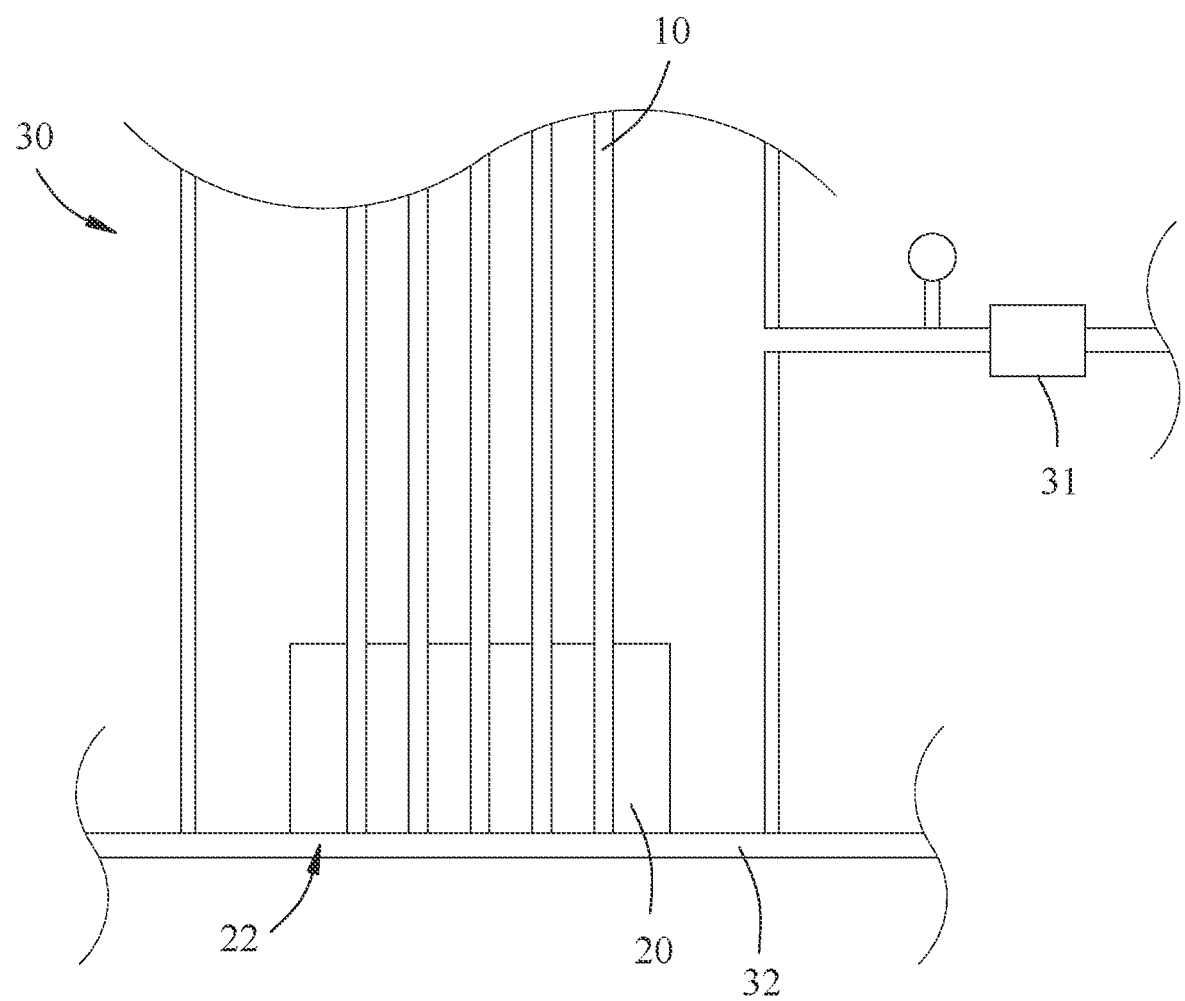
FIG. 1 is a first schematic diagram of the equipment to pre-seal the fluororesin heat exchange device.

With reference to FIG. 1, a fluororesin bundle of heat exchange device comprises a plurality of fluororesin tubes 10 and a fixing element 20. In a preferred embodiment of the present invention, each fluororesin tube 10 is a hollow tube made by polyfluoroalkoxy (PFA).

The fixing element 20 is bulk-like and is made by fluororesin material and has a plurality of holes 21 being formed through the fixing element 20. An end of each fluororesin tube 10 is inserted into each hole 21 respectively. In this preferred embodiment of the present invention, the holes 21 are parallelly formed through the fixing element 20, thus, the fluororesin tubes 10 are held by the fixing element 20 as a bundle.

The material of the fixing element 20 can be polytetrafluoroethene (PTFE), fluorinated ethylene propylene (FEP), polyfluoroalkoxy (PFA), Ethylene-tetra-fluoro-ethylene (ETFE), polyvinylidene difluoride (PVDF) or mixture thereof. In one of preferred embodiment, the fixing element 20 is made by PTFE. PTFE provides a better material performance with chemical resistance and has a smooth and stick less surface.

The present invention also provides a manufacturing method of fluororesin bundle of heat exchange device having steps comprising of:

Step 1) placing one end of each the plurality of fluororesin tubes 10 respectively into each hole 21 that the plurality of fluororesin tubes 10 can be sleeved by the fixing element 20 to form a bundle. In the preferred embodiment, end face of the end of each fluororesin tube 10 and the fixing element 20 form a flat surface 22. The flat surface 22 provides a better heating uniformity to mount the fluororesin tubes 10 in the holes 21 of the fixing element 20.

Step 2) placing the bundle in a vacuum equipment 30, wherein, the vacuum equipment 30 comprises a vacuum device 31 and a thermal device 32. The vacuum device 31 generates a vacuum environment to the bundle. Simultaneously, the thermal device 32 provides a thermal energy to the flat surface 22 to melt the ends of each fluororesin tube 10 in the fixing element 20. In this preferred embodiment of the present invention, said melt of the ends of each fluororesin tube 10 means that the ends of the fluororesin tubes 10 are heated to a status being deformable, where a corresponding temperature to heat the fluororesin tubes 10 can be the same or slightly less than a melting temperature of the fluororesin tubes 10.

Figure 2:
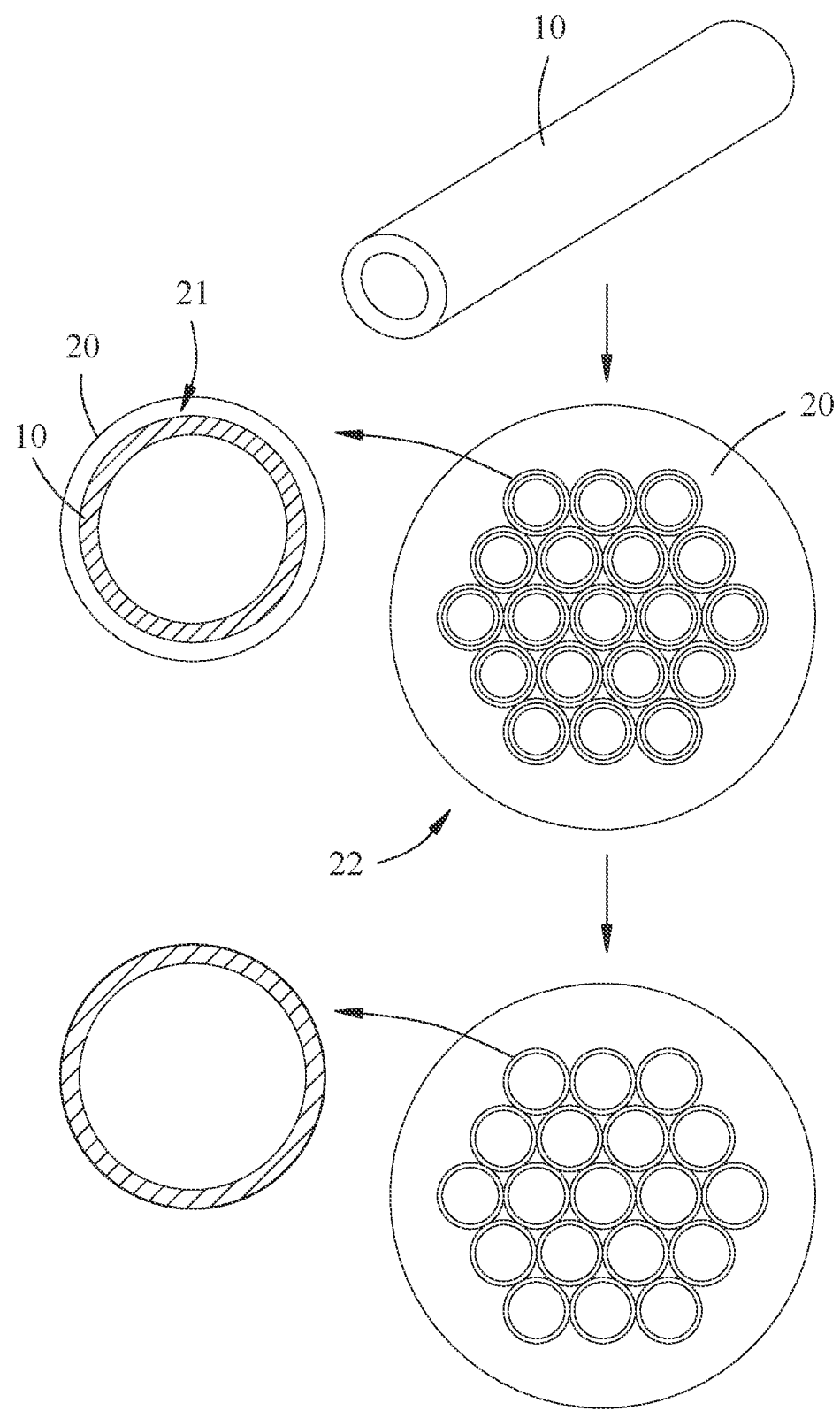
FIG. 2 is a pre-sealing schematic diagram of the fluororesin tubes and the fixing element.
Figure 3:
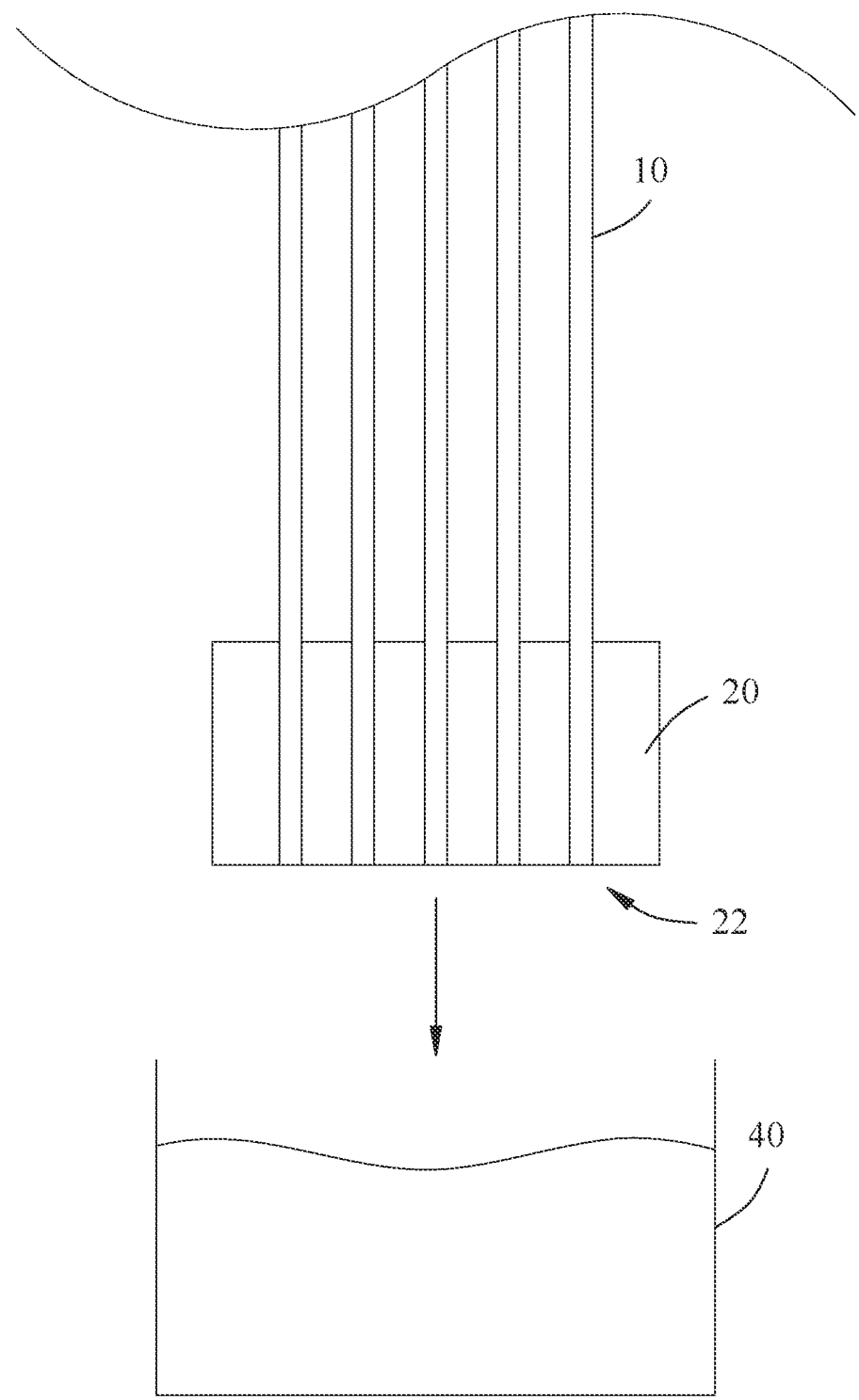
FIG. 3 is a second schematic diagram of the of the equipment to mount the fluororesin tubes on the fixing element.

With reference to FIG. 2, the bundle is placed into the vacuum equipment 30 and the flat surface 22 is placed securely onto the thermal device 32, thus inner space of the fluororesin tubes 10 are separated from the vacuum environment of the vacuum equipment 30. While the ends of the fluororesin tubes 10 closing to the flat surface 22 being heated to deformable status, the ends of the fluororesin tubes 10 are deformed since pressure of the inner spaces are higher than the vacuum environment. The deformed ends of the fluororesin tubes 10 can be fully or partially mounted on inner wall of the holes 21 respectively. In this preferred embodiment of the present invention, the vacuum equipment 30 applies a vacuum pressure in the range from 0.1 kg/cm² to 0.3 kg/cm².

In the preferred embodiment, the thermal device 32 is a thermal radiation plate providing a flat contact surface being securely mounted with the flat surface 22 and provides uniform heating performance to the ends of the fluororesin tubes 10 inside the fixing element 20 and a pressure difference between the inner space and the vacuum environment also being created. In this preferred embodiment, a preferred length of deformed ends of the fluororesin tubes 10 is 2 mm+/−1 mm.

In this preferred embodiment, the fixing element 20 is made by PTFE which has a higher melting point comparing to the PFA that the fixing element 20 may not be melted when the ends of the fluororesin tubes 10 are heated by the thermal device 32. And, the characteristics of the PTFE, the fixing element 20 presents a white color at room temperature. While the thermal device 32 applies the heat to the flat surface 22 formed by the fluororesin tubes 10 and the fixing element 20, the fixing element 20 may gradually turn into a transparent appearance from the end which close to the flat surface 22. With the material characteristics above mentioned, it can be directly observed the changes of the color of the fixing element 20 by visual examination if the fluororesin tube 10 is pre-sealed to the fixing element 20 in the preferred length.

Step 3) immersing the bundle into a heating pool 40 from the flat surface 22. The heating pool 40 fills a heated liquid and provides a Celsius temperature between 150-500 degrees to heat up the heated liquid, thus the heated liquid melts and deforms the fluororesin tube 10. The heated liquid in the heating pool 40 may be filled in the inner space of each fluororesin tube 10 while the bundle is immersed into heating pool 40. In the preferred embodiment of the present invention, the heated liquid is filled into the fluororesin tube 10 to deform the fluororesin tube 10 and provides a pressure to push the deformed fluororesin tube 10 against the inner wall of the holes 21. Thus, the fluororesin tubes 10 can be securely mounted with the fixing element 20.

In this preferred embodiment, vacuum chamber (i.e. the vacuum equipment 30) and heating plate (i.e. the thermal device 32) are used to pre-seal the fluororesin tubes 10 and the fixing element 20 at the flat surface 22, and the heated liquid is then used to extend the mounted surface between the fluororesin tubes 10 and the fixing element 20. Thus, a high quality mounted the fluororesin tubes 10 and the fixing element 20 can be done by using the above processes.

In another preferred embodiment in accordance with the present invention, the immersing process can be separated into few steps until a preferred immersion depth is achieved, that is, the bundle is immersed and maintained at a certain depth for a while to wait a partial section of the fluororesin tubes 10 being securely mounted on the inner surface of the holes 21, and then immerses more to mount next section of the fluororesin tubes 10 with the fixing element 20. By using this gradual immersing process, air between the inner wall of holes and the fluororesin tubes 10 can be completely removed, thus a perfect mounting result between the fluororesin tubes 10 and the fixing element 20 is achieved.

The heated liquid is preferred to have a salt therein, the salt can be potassium nitrate, sodium nitrite, sodium chloride, calcium chloride, lithium carbonate, potassium carbonate, sodium carbonate, barium chloride or mixture thereof, wherein a concentration of the salt in the heated liquid can be 20-80%.

In another preferred embodiment in accordance with the present invention, when the fluororesin tubes 10 are mounted with the fixing element 20 during the immersing process, the vacuum equipment 30 can also provide the vacuum environment to the bundle continuously. Thus, each fluororesin tube 10 can not only receives the outwardly-push from the inner space, generating by the heating pool 40, also can accept the pulling-pressure applied from the vacuum equipment 30, that can be mounted with the fixing element 20 more secure.

The fluororesin bundle manufactured through the steps mentioned above is further received a hydrostatic test under a 3 MPa/cm² water pressure. The result of fluororesin bundle which maintained under the pressure condition for 30 minutes without leakage shows that the fluororesin tubes 10 and the fixing element 20 present the prefect mounting feature.

The fluororesin bundle of heat exchange device revealed by the present invention can achieve the following advantages:

1. Cooperating the vacuum device 31 and the thermal device 32 to pre-seal the fluororesin tubes 10 and the fixing element 20 simultaneously can reduce defective rate less than 1% and overcome false welding phenomenon.
2. Each section of the fluororesin tubes 10 can receive the thermal energy equally from immersed into the heating pool 40 and securely mounted on the inner surface of the holes 21, which can prevent uneven heating situation.
3. Combining the pre-sealing process to form the bundle and immersing process to securely mount the fluororesin tube 10 with the fixing element 20 can reduce the spending time more than 80% comparing to only use a thermal radiation method with slowly heat transfer rate.
4. After thermal radiation plate (thermal device 32) pre-sealing and the heating pool 40 immersing, the fluororesin tube 10 can be heated and mounted with fixing element 20 evenly that a thickness of the fluororesin tubes 10 can be remained consistent, and avoid forming a bending structure, which can improve the quality for use.
5. Pre-sealing the ends of the each fluororesin tube 10 in the fixing element 20 before immersing into the heating pool 40 can prevent the heated liquid of the heating pool 40 from remaining in the space between the fluororesin tube 10 and the hole 21, thus can maintain the cleanness of the manufacturing process and avoid the risk of pollution.
6. The fluororesin bundle remains the flat surface 22 after the manufacturing method mentioned above, which can be used immediately without other secondary processing.

What is claimed is:

1. A manufacturing method of fluororesin bundle of heat exchange device having multiple fluororesin tubes and a fixing element with multiple holes for accepting the fluororesin tubes, the method comprising steps of:
   1) Placing one end of each the fluororesin tubes respectively into each hole to hold the fluororesin tubes by the fixing element and forming a bundle, wherein end surfaces of the ends of the fluororesin tubes and the fixing element form a flat surface;
   2) Providing a vacuum environment to the bundle and a thermal energy to the flat surface simultaneously to melt and deform the ends of the fluororesin tubes and mount the deformed end sections of the fluororesin tubes near the end surfaces thereof on inner wall of the holes respectively; and
   3) Immersing the pre-sealed bundle into a heating pool from the flat surface to extend the mounted surface between the fluororesin tubes and the fixing element.

2. The manufacturing method of fluororesin bundle of heat exchange device as claimed in claim 1, wherein the vacuum equipment applies a vacuum pressure in the range from 0.1 kg/cm² to 0.3 kg/cm².

3. The manufacturing method of fluororesin bundle of heat exchange device as claimed in claim 2, wherein the thermal energy melt and deform a preferred length of deformed ends of the fluororesin tubes is 2 mm+/−1 mm.

4. The manufacturing method of fluororesin bundle of heat exchange device as claimed in claim 3, wherein continuously provide the vacuum environment to the bundle during the immersing process.

5. The manufacturing method of fluororesin bundle of heat exchange device as claimed in claim 4, wherein the heating pool fills a heated liquid and provides Celsius temperature between 150-500 degrees to continuously heat up the heated liquid.

6. The manufacturing method of fluororesin bundle of heat exchange device as claimed in claim 5, wherein the immersing process is separated into few steps with immersing and maintaining the bundle at a certain depth for a while to wait a partial section of the fluororesin tubes being securely mounted on the inner surface of the holes, and then immerse more to mount next section of the fluororesin tubes with the fixing element until a preferred immersion depth being achieved.

7. The manufacturing method of fluororesin bundle of heat exchange device as claimed in claim 6, wherein use a thermal radiation plate to provide a flat contact surface being securely mounted with the flat surface.

8. The manufacturing method of fluororesin bundle of heat exchange device as claimed in claim 7, wherein the heated liquid is preferred to have a salt therein, the salt can be potassium nitrate, sodium nitrite, sodium chloride, calcium chloride, lithium carbonate, potassium carbonate, sodium carbonate, barium chloride or mixture thereof.

9. The manufacturing method of fluororesin bundle of heat exchange device as claimed in claim 8, wherein a concentration of the salt in the heated liquid can be 20-80%.

10. The manufacturing method of fluororesin bundle of heat exchange device as claimed in claim 5, wherein use a thermal radiation plate to provide a flat contact surface being securely mounted with the flat surface.

11. The manufacturing method of fluororesin bundle of heat exchange device as claimed in claim 10, wherein the heated liquid is preferred to have a salt therein, the salt can be potassium nitrate, sodium nitrite, sodium chloride, calcium chloride, lithium carbonate, potassium carbonate, sodium carbonate, barium chloride or mixture thereof.

12. The manufacturing method of fluororesin bundle of heat exchange device as claimed in claim 11, wherein a concentration of the salt in the heated liquid can be 20%-80%.

* * * * *